(12) United States Patent
Choi et al.

(10) Patent No.: US 11,279,538 B2
(45) Date of Patent: Mar. 22, 2022

(54) LID PACKING MATERIAL FOR FOOD CONTAINER

(71) Applicant: DONGWON SYSTEMS CORPORATION, Gyeonggi-do (KR)

(72) Inventors: Jin Seok Choi, Gyeonggi-do (KR); Sung Ji Choi, Gyeonggi-do (KR)

(73) Assignee: DONGWON SYSTEMS CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/139,745

(22) Filed: Dec. 31, 2020

(65) Prior Publication Data
US 2021/0237950 A1 Aug. 5, 2021

(30) Foreign Application Priority Data
Jan. 31, 2020 (KR) .................. 10-2020-0012019

(51) Int. Cl.
*B65D 65/42* (2006.01)
*B32B 3/12* (2006.01)
(Continued)

(52) U.S. Cl.
CPC ............ *B65D 65/42* (2013.01); *B32B 3/12* (2013.01); *B32B 3/14* (2013.01); *B32B 7/14* (2013.01); *B32B 27/08* (2013.01); *B32B 27/36* (2013.01); *B32B 2255/10* (2013.01); *B32B 2255/24* (2013.01); *B32B 2305/30* (2013.01); *B32B 2307/31* (2013.01); *B32B 2307/538* (2013.01);
(Continued)

(58) Field of Classification Search
CPC ......... B32B 3/12; B32B 3/14; B32B 2391/00; B32B 2435/02; B32B 7/14; B32B 2307/73; B32B 2307/31; B32B 2307/538; B32B 2439/70; B65D 2543/00259; B65D 2543/00314; B65D 2543/00; B65D 2543/00009; B65D 65/42
See application file for complete search history.

(56) References Cited

U.S. PATENT DOCUMENTS

| | | | |
|---|---|---|---|
| 2004/0127614 A1* | 7/2004 | Jiang | C09J 123/12 524/270 |
| 2013/0251769 A1* | 9/2013 | Smith | B65D 85/72 424/401 |

(Continued)

FOREIGN PATENT DOCUMENTS

| | | |
|---|---|---|
| CN | 102152565 | 8/2011 |
| CN | 103347395 | 10/2013 |

(Continued)

OTHER PUBLICATIONS

"Carnauba Wax", 2017, Chemical Book, https://www.chemicalbook.com/ChemicalProductProperty_US_CB1242157.aspx (Year: 2017).*

(Continued)

*Primary Examiner* — Jasper Saberi
(74) *Attorney, Agent, or Firm* — Hodgson Russ LLP

(57) ABSTRACT

The example embodiments relate to a lid packing material for food container, and a lid packing material for food container according to an aspect of the example embodiments includes: a substrate layer; and a heat-adhesion layer formed on the substrate layer, wherein the heat-adhesion layer includes at least two types of wax having different melting points.

12 Claims, 7 Drawing Sheets

(51) Int. Cl.
    *B32B 3/14*     (2006.01)
    *B32B 7/14*     (2006.01)
    *B32B 27/08*     (2006.01)
    *B32B 27/36*     (2006.01)

(52) U.S. Cl.
    CPC ....... *B32B 2307/73* (2013.01); *B32B 2391/00* (2013.01); *B32B 2405/00* (2013.01); *B32B 2435/02* (2013.01); *B32B 2439/70* (2013.01); *B32B 2553/00* (2013.01); *B65D 2543/00* (2013.01); *B65D 2543/00009* (2013.01); *B65D 2543/00259* (2013.01); *B65D 2543/00314* (2013.01)

(56) References Cited

U.S. PATENT DOCUMENTS

| | | | |
|---|---|---|---|
| 2015/0017334 A1* | 1/2015 | Sekiguchi | B32B 38/164 |
| | | | 427/384 |
| 2015/0175317 A1* | 6/2015 | Imai | C09D 5/1693 |
| | | | 220/200 |
| 2017/0130155 A1* | 5/2017 | Okada | C09D 7/65 |
| 2018/0086037 A1* | 3/2018 | Araki | B32B 1/02 |
| 2019/0335596 A1* | 10/2019 | Wu | H05K 5/02 |
| 2020/0010253 A1* | 1/2020 | Borsky | B65D 65/46 |

FOREIGN PATENT DOCUMENTS

| | | |
|---|---|---|
| CN | 107428115 | 12/2017 |
| CN | 110641097 | 1/2020 |
| JP | 2004058648 | 2/2004 |
| JP | 2014046983 | 3/2014 |
| JP | 2017100778 | 6/2017 |
| JP | 2019034462 | 3/2019 |
| JP | 2019218099 | 12/2019 |
| KR | 101006557 | 1/2011 |
| KR | 101330001 | 11/2013 |
| KR | 101988717 | 6/2019 |

OTHER PUBLICATIONS

"Paraffin Wax", 2003, InChem.org, http://www.inchem.org/documents/icsc/icsc/eics1457.htm (Year: 2003).*

KIPO, Office Action for KR Application No. 10-2020-0012019, dated Aug. 3, 2020.

KIPO, Notice of Allowance for KR Application No. 10-2020-0012019, dated Sep. 1, 2020.

* cited by examiner

LID PACKING MATERIAL FOR FOOD CONTAINER

CROSS-REFERENCE TO RELATED APPLICATION

This application claims priority to Korean Patent Application No. 10-2020-0012019, filed Jan. 31, 2020, the entire disclosure of which is incorporated herein by reference.

BACKGROUND

1. Field of the Invention

Example embodiments relate to a lid packing material for food container.

2. Description of the Related Art

There are various methods of implementing water repellency on the surface of a product. For example, when a micro- or nanometer-sized microstructure is formed on the surface of the product, the product may have water repellency, preferably super water-repellent property. In addition, there is a method of treating the surface of a hydrophobic material as a method for implementing a water-repellent surface.

In packing materials for packaging contents such as various foods, medicines, and cosmetic materials, the water repellency is required in addition to barrier property, sealing property, and the like. Particularly, there has been a problem in which the contents are adhered to the packing materials in packing materials for packing contents having properties of a liquid phase, a viscous body, a gel phase or the like, for example, contents of food such as milk, fruit drink, liquid yogurt and semisolid yoghurt. Accordingly, a cover capable of continuously demonstrating non-adhesive property has been proposed.

In case of packing materials for packing the contents having properties of the liquid phase, the viscous body and the gel phase, non-adhesive property which makes it difficult for the contents to adhere to the surface of the packing materials is required in addition to barrier property, sealing property, and the like. When the contents are adhered to the surface of the packing materials, a loss is incurred that much since a drinker cannot drink all of the contents, and there is a sanitary problem as the hands are coated with the contents. Such a non-adhesive property may be implemented by giving water repellency, preferably super water-repellent property to the surface of the packing materials.

Generally, sheet-type (or a film-type) packing materials have a multi-layered structure, and these include basically a support having barrier property, and a sealant layer which is formed on at least one surface of the support. At this time, the sealant layer is thermally bonded (thermally fused) to promote sealability. Further, as packing materials to which non-adhesive property (water repellency) is given, there is an adhesion prevention lid which promotes adhesion prevention (water repellency) of contents by containing a non-ionic surfactant or a hydrophobic additive in the sealant layer. However, since it is difficult for the non-ionic surfactants or the hydrophobic additive to come into contact with the contents (such as yogurt), it is hard for the adhesion prevention lid to show non-adhesive property.

Further, a laminate and a container having hydrophobic oxide particles (hydrophobic silica particles) adhered to surfaces of outermost layers thereof are presented. Since the hydrophobic oxide particles are exposed to the surfaces of the laminate and the container to come into contact with the contents, non-adhesive property (water repellency) may be improved. However, although the packing materials not only require non-adhesive property (water repellency), but also should have excellent heat-adhesion strength with an adherend for the safe storage of the contents above all, these considerations are not considered in most of the packing materials. Particularly, after a lid material for packaging is thermally bonded (thermally fused) to a packing container, the lid material for packaging must have excellent heat-adhesion strength on the adhesive interface to maintain sealability. However, it is difficult for the lid material for packaging to show excellent heat-adhesion strength.

Therefore, it is required to develop a sealing packing material for viscous liquid containers having water repellency while maintaining excellent heat-adhesion strength.

SUMMARY

In order to solve the aforementioned problems, an aspect of the example embodiments provides a lid packing material for food container, the lid packing material which can give high water repellency enabling adhesion prevention of food, and has excellent thermal adhesive property.

However, problems that the example embodiments seek to solve are not limited to those mentioned above, and other problems which have not been mentioned may be clearly understood from the description below by a person skilled in the art.

According to an aspect, there is provided a lid packing material for food container including: a substrate layer; and a heat-adhesion layer formed on the substrate layer, wherein the heat-adhesion layer includes at least two types of wax having different melting points.

In an embodiment, the wax may include a mixture of at least two types of wax selected from the group consisting of a petroleum wax, a vegetable wax, and an animal wax.

In an embodiment, the wax may include a mixture of at least two selected from the group consisting of beeswax, paraffin wax, microcrystalline wax, polyolefin wax, polyethylene wax, polypropylene wax, acrylate wax, fatty acid amide wax, silicon wax, polytetrafluoroethylene wax, carnauba wax, bayberry wax, beeswax, Shellac wax, Spermaceti wax, Montan wax, Ozokerite wax, Ceresin wax, Fischer-Tropsch wax, sugar cane wax, Bake wax, rice bran wax, and Candelilla wax.

In an embodiment, one of the at least two types of wax having different melting points of the heat-adhesion layer may be carnauba wax.

In an embodiment, the carnauba wax may be contained in an amount of 30 wt % to 60 wt % with respect to the total weight of the at least two types of wax having different melting points.

In an embodiment, the wax may be a mixture obtained by mixing two types of wax having different melting points at a weight ratio of 10:1 to 30:1.

In an embodiment, the heat-adhesion layer may further include at least one selected from the group consisting of a polymethylmethacrylate (PMMA) bead, a glass bead, a zirconia bead, a ceramic bead, a metal bead, and a resin bead.

In an embodiment, the heat-adhesion layer may include at least one pattern selected from the group consisting of a circular pattern, a hollow pattern, an elliptical pattern, a triangular pattern, a square pattern, a pentagonal pattern, a hexagonal pattern, an octagonal pattern, a cylindrical pattern, and a polyprism pattern, and may include patterns arranged in a grid pattern.

In an embodiment, the patterns may have an average size of 50 μm to 200 μm.

In an embodiment, the heat-adhesion layer may have a thickness of 50 μm to 200 μm.

In an embodiment, the lid packing material for food container may further include hydrophobic particles on the heat-adhesion layer.

In an embodiment, the hydrophobic particles may include at least one selected from the group consisting of silica, alumina, aluminosilicate, titanic, silica aerogel, iron oxide, zinc oxide, copper oxide, nickel oxide, and cobalt oxide.

In an embodiment, the hydrophobic particles may have a particle size of 1 nm to 2,000 nm.

In an embodiment, the hydrophobic particles may be buried between respective cells forming patterns of the heat-adhesion layer.

In an embodiment, the buried hydrophobic particles may be buried to a thickness of 1 μm to 50 μm.

In an embodiment, the lid packing material for food container may have a water contact angle of 150° or more at room temperature and 100° to 140° at a temperature of 50° C. or more.

In an embodiment, the lid packing material for food container may have a surface roughness including a central line average roughness Sa of 20 μm to 30 μm and a ten point average roughness Sz of 8 μm to 15 μm.

In an embodiment, the lid packing material for food container may have a line roughness including a central line average roughness Ra of 15 μm to 25 μm and a ten point average roughness Rz of 35 μm to 45 μm.

Additional aspects of example embodiments will be set forth in part in the description which follows and, in part, will be apparent from the description, or may be learned by practice of the disclosure.

According to example embodiments, a lid packing material for food container may be used as a packing material which prevents a liquid phase, a viscous body or a gel phase such as, for example, milk, fruit drink, liquid yogurt and semisolid yoghurt from being smeared in the packing material by expressing water repellency and oil repellency. As a heat-adhesion layer of the lid packing material for food container is coated with at least two types of wax having different melting points to preserve super water-repellent performance in relatively high temperature conditions, the heat-adhesion layer of the lid packing material for food container can inhibit removal or contamination of hydrophobic particles while preventing a viscous liquid from being smeared in the lid packing material for food container. Further, the heat-adhesion layer of the lid packing material for food container can have higher strength in sealing strength.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
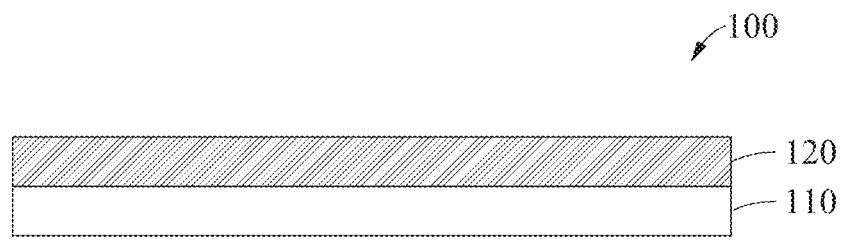
FIG. 1 is a cross-sectional view of a lid packing material for food container according to an embodiment of example embodiments.

Hereinafter, embodiments of example embodiments will be described in detail with reference to the accompanying drawings. In the description of the example embodiments, if detailed descriptions of related disclosed art or configuration are determined to unnecessarily make the gist of the example embodiments obscure, they will be omitted. Also, terms used in the present specification, as terms which are used so as to appropriately describe a preferred embodiment of the example embodiments, might be differently defined depending on the user's or operator's intention or the practices of the field that the example embodiments belong to. Therefore, the terms should be defined based on overall contents of the present specification. The same reference numerals as shown in each drawing represent same members.

In the whole present specification, when any member is positioned "on" the other member, this not only includes a case that the any member is brought into contact with the other member, but also includes a case that another member exists between two members.

In the whole present specification, if a prescribed part "includes" a prescribed element, this means that another element can be further included instead of excluding another element.

Hereinafter, a lid packing material for food container according to example embodiments will be described in detail with reference to Example and drawings. However, the example embodiments are not limited to such Example and drawings.

A lid packing material for food container according to an embodiment of the example embodiments includes: a substrate layer; and a heat-adhesion layer formed on the substrate layer, and the heat-adhesion layer includes at least two types of wax having different melting points.

A lid packing material for food container according to an embodiment of the example embodiments may be used as a packing material which prevents a liquid phase, a viscous body or a gel phase such as, for example, milk, fruit drink, liquid yogurt and semisolid yoghurt from being smeared in the packing material by expressing water repellency and oil repellency. As a heat-adhesion layer of the lid packing material for food container is coated with at least two types of wax having different melting points to preserve super water-repellent performance in relatively high temperature conditions, the heat-adhesion layer of the lid packing material for food container can inhibit removal or contamination of hydrophobic particles while preventing a viscous liquid from being smeared in the lid packing material for food container. Further, the heat-adhesion layer of the lid packing material for food container can have higher strength in sealing strength.

FIG. 1 is a cross-sectional view of a lid packing material for food container according to an embodiment of example embodiments.

Referring to FIG. 1, a lid packing material 100 for food container according to an embodiment of example embodiments includes a substrate layer 110 and a heat-adhesion layer 120.

In an embodiment, the substrate layer 110 may include at least one selected from the group consisting of paper, synthetic paper, a resin film, a synthetic resin film, and a metal foil. The substrate layer 110 may include, for example, OPP (Oriented Poly Propylene), PET (Polyethylene Terephthalate), LLDPE (linear low-density polyethylene), PE (Polyethylene), PP (Poly propylene), PO (polyolefin), PBT (Polybutylene Terephthalate), PPS (Poly phenylene Sulfide), a nylon material, a polyethylene film, an epoxy-based film or an aluminum foil, and may also include a substrate layer in which two or more types thereof are laminated. In an embodiment, the substrate layer 110 may have a thickness of 30 μm to 150 μm. Since the substrate is too thin when the thickness of the above substrate layer is less than 30 μm, there are problems including creasing fault and poor application of wax hotmelt, and when the thickness of the substrate layer exceeds 150 μm, adhesion with the container may be deteriorated since the substrate is too thick so that the heat transfer power is lowered. The thickness of the substrate layer may be adjusted according to the type of food contents, container, or the like.

In an embodiment, the lid packing material for food container may further include a barrier layer (not shown) on the substrate layer 110. The barrier layer may perform a barrier role of blocking transmission of oxygen, water vapor, light, etc. The barrier layer may comprise at least one selected from the group consisting of $AlO_x$, $SiO_x$, Aluminum, VMPET (Vacuum metalized PET), NYLON, OPP (Oriented polypropylene), CPP (Casting Polypropylene), Aluminum Foil, EVOH, PVDC, and PE (Polyethylene). For example, when the barrier layer comprises VMPET, the substrate layer may secure high heat resistance, gas barrier properties, moisture proofing properties, light shielding properties, etc.

In an embodiment, the heat-adhesion layer 120 may include at least one selected from the group consisting of a polyolefin-based adhesive, a polyester-based adhesive, a sealant adhesive, a hot-melt adhesive, an epoxy-based adhesive, a urethane adhesive, a polyurethane-based adhesive, an acrylic-based adhesive, a vinyl-based adhesive, a lacquer adhesive, and an easy fill adhesive. For example, the sealant adhesive and the hot-melt adhesive may be simultaneously used in the heat-adhesion layer 120. The hot-melt adhesive may be, for example, an ethylene vinyl acetate (EVA) based hot-melt adhesive. The sealant adhesive has excellent adhesive strength due to surface characteristics of the heat-adhesion layer 120, and the hot-melt adhesive as an auxiliary adhesive plays a role of holding the sealant until a sealant is cured during an adhesion process.

In an embodiment, since the heat-adhesion layer 120 is excellent in water-repellent performance and can effectively prevent and inhibit the separation of hydrophobic particles to be described layer, the heat-adhesion layer 120 can exhibit water repellency and oil repellency for a long period of time, and has excellent adhesion performance with the container.

In an embodiment, the heat-adhesion layer (120) comprises at least two types of wax having different melting points.

In an embodiment, the wax may include a mixture of at least two types of wax selected from the group consisting of a petroleum wax, a vegetable wax, and an animal wax.

In an embodiment, the wax may include a mixture of at least two selected from the group consisting of beeswax, paraffin wax, microcrystalline wax, polyolefin wax, polyethylene wax, polypropylene wax, acrylate wax, fatty acid amide wax, silicon wax, polytetrafluoroethylene wax, carnauba wax, bayberry wax, beeswax, Shellac wax, Spermaceti wax, Montan wax, Ozokerite wax, Ceresin wax, Fischer-Tropsch wax, sugar cane wax, Bake wax, rice bran wax, and Candelilla wax.

In an embodiment, the wax may be: a petroleum wax, e.g., paraffin wax, intermediate wax, or microcrystalline wax; a vegetable wax, e.g., carnauba wax; or an animal wax, e.g., beeswax. The paraffin wax is defined as mainly a linear saturated hydrocarbon, and smaller percentages of a branched compound and a cyclo-paraffin based compound. The intermediate wax, which has a feature in the middle of a feature of paraffin wax and feature of microcrystalline wax, is a mixture of a linear compound, a branched compound and a cyclo-paraffin based compound. The microcrystalline wax of which broader range of constituents contains high portions of branched hydrocarbon and cyclo-paraffin based hydrocarbon, is a hydrocarbon having a higher average molecular weight than an average molecular weight of the paraffin wax. The vegetable and animal waxes are synthesized by a number of plants and animals. A wax of animal origin typically consists of a wax ester derived from various carboxylic acid and fat alcohol. In a wax of plant origin, a unique mixture of non-esterized hydrocarbons may predominate over ester. Since these are mixtures, a naturally generated wax is softer, and melts at lower temperatures than pure ingredients.

In an embodiment, one of the at least two types of wax having different melting points in the heat-adhesion layer may be carnauba wax. The carnauba wax is a vegetable wax with a high melting point and low cost. Accordingly, the heat-adhesion layer comprising the carnauba wax can preserve water-repellent performance even in relatively high temperature conditions by increasing the melting point In an embodiment, the carnauba wax may be contained in an amount of 30 wt % to 60 wt % with respect to the total weight of the at least two types of wax having different melting points. When the carnauba wax is contained in an amount of less than 30 wt % with respect to the total weight of the at least two types of wax having different melting points, the heat-adhesion layer may not exhibit water-repellent performance at relatively high temperatures, and, even when the carnauba wax is contained in an amount of more than 60 wt % with respect to the total weight of the at least two types of wax having different melting points, the heat-adhesion layer does not exhibit excellent effects.

In an embodiment, the wax may be a mixture in which two types of wax having different melting points are mixed to a weight ratio of 10:1 to 30:1. It is apprehended that the wax shows no change in the melting point when the two types of wax having different melting points are mixed to a weight ratio of less than 10:1, and it is apprehended that there may be a problem of compatibility in which the two types of wax having different melting points are not mixed with each other when the two types of wax having different melting points are mixed to a weight ratio of more than 30:1.

In an embodiment, the heat-adhesion layer 120 may further include at least one selected from the group consisting of a polymethylmethacrylate (PMMA) bead, a glass bead, a zirconia bead, an alumina bead, a titania bead, a ceramic bead, a metal bead, and a resin bead.

Figure 2:
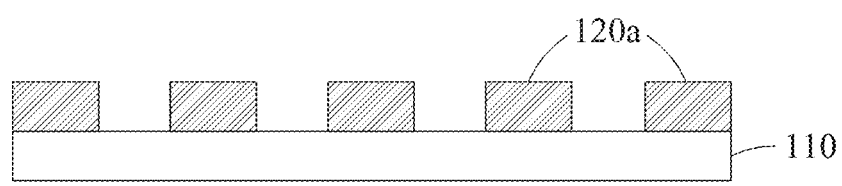
FIG. 2 is a cross-sectional view of a lid packing material for food container according to another embodiment of the example embodiments.
Figure 3:
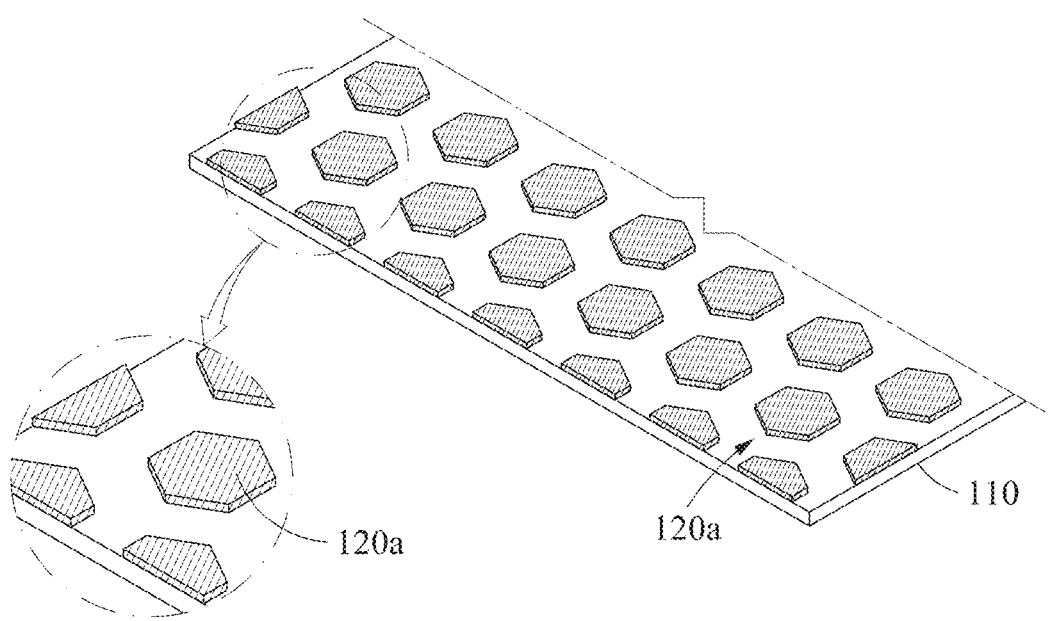
FIG. 3 is a perspective view of a lid packing material for food container according to another embodiment of the example embodiments.

FIG. 2 is a cross-sectional view of a lid packing material for food container according to another embodiment of the example embodiments, and FIG. 3 is a perspective view of a lid packing material for food container according to another embodiment of the example embodiments.

Referring to FIGS. 2 and 3, a heat-adhesion layer 120 of a lid packing material for food container according to another embodiment of the example embodiments may include patterns 120a.

In an embodiment, the heat-adhesion layer 120 may include at least one pattern 120a selected from the group consisting of a circular pattern, a hollow pattern, an elliptical pattern, a triangular pattern, a square pattern, a pentagonal pattern, a hexagonal pattern, an octagonal pattern, a cylindrical pattern, and a polyprism pattern, and may include patterns arranged in a grid pattern. The polyprism may include a triangular prism, a square pillar, a hexagonal column, etc.

FIG. 3 illustrates a view in which a hexagonal pattern is arranged in a honeycomb structure. The honeycomb structure may have an arrangement relationship that brings together three regular hexagonal vertices with an internal angle of 120°. Since the honeycomb structure allows plural regular hexagonal columns to be connected in succession and has a structure in which sides of each column face each other, the honeycomb structure may distribute forces in a balanced way and have high space utilization. If tensile force is applied to the face of the packing material when forming a regular hexagonal pattern, the honeycomb structure may have a higher rupture preventing effect since the dispersion of forces occurs in six directions.

Although a hexagonal or hexagonal column pattern are is disclosed in the drawing, various patterns may be arranged.

In an embodiment, patterns 120a of the heat-adhesion layer 120 may implement water-repellent properties of the surface of the packing material by performing a role of allowing air existing in a space between the patterns to push water or fluid smeared in a packing material to the outside. Since the packing material has more improved hydrophobicity, water repellency and oil repellency by the patterns formed in the heat-adhesion layer, the contents may easily flow down even if contents are smeared in the packing material, and the amount of the contents smeared in the packing material is minimized accordingly so that consumers may eat more of the contents.

In an embodiment, the patterns 120a may have an average size of 50 μm to 200 μm. It is apprehended that the patterns are not formed when the patterns 120a have an average size of less than 50 μm, and it is apprehended that water-repellent performance is deteriorated when the patterns 120a have an average size of more than 200 μm. When the patterns 120a are formed in the form of a cylinder or polyprism, the patterns 120a may have a height of 50 μm to 200 μm.

In an embodiment, the heat-adhesion layer 120 may have a thickness of 50 μm to 200 μm. It is apprehended that heat-adhesion may not be carried out during the water-repellent coating process when the heat-adhesion layer 120 has a thickness of less than 50 μm, and it is apprehended that the patterns are collapsed when the heat-adhesion layer 120 has a thickness of more than 200 μm.

In an embodiment, the lid packing material for food container may further include hydrophobic particles on the heat-adhesion layer.

Figure 4:
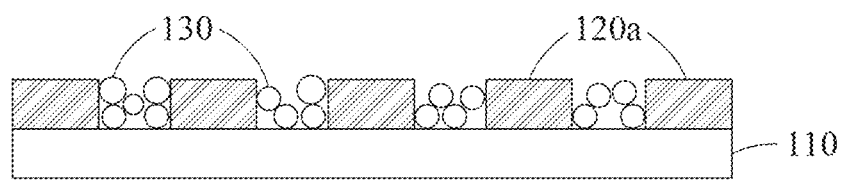
FIG. 4 is a cross-sectional view showing the surface of a heat-adhesion layer according to an embodiment of the example embodiments.

FIG. 4 is a cross-sectional view showing the surface of a heat-adhesion layer according to an embodiment of the example embodiments.

Referring to FIG. 4, the lid packing material for food container further includes hydrophobic particles 130 between the patterns 120a of a heat-adhesion layer according to an embodiment of the example embodiments. The hydrophobic particles 130 may be hydrophobic oxide particles.

In an embodiment, the hydrophobic particles 130 may include at least one selected from the group consisting of silica, alumina, aluminosilicate, titanic, silica aerogel, iron oxide, zinc oxide, copper oxide, nickel oxide, and cobalt oxide.

In an embodiment, the hydrophobic particles 130 may have a particle size of 1 nm to 2,000 nm. The effects are insignificant as the hydrophobic particles do not exhibit hydrophobic, water-repellent and oil-repellent effects when the hydrophobic particles 130 has a particle size of less than 1 nm, and there is a problem that a portion of the heat-adhesion layer having the hydrophobic particles formed therein becomes nonuniform as the hydrophobic particles are dispersed nonuniformly when the hydrophobic particles 130 has a particle size of more than 2,000 nm.

In an embodiment, a method of coating the hydrophobic particles 130 may include, for example, at least one selected from the group consisting of spray coating, gravure coating, die coating, comma coating, roll coating, curtain coating, bar coating, doctor blade, and spin coating.

In an embodiment, the hydrophobic particles 130 may be coated on the heat-adhesion layer 120 in a coating amount of 0.1 $g/m^2$ to 10 $g/m^2$. Water repellency and oil repellency of a packing material may not be properly expressed when the hydrophobic particles are coated on the heat-adhesion layer in a coating amount of less than 0.1 $g/m^2$, and contamination or the like may occur accordingly as the hydrophobic particles are removed from the packing material when the hydrophobic particles are coated on the heat-adhesion layer in a coating amount of more than 10 $g/m^2$.

In an embodiment, the hydrophobic particles 130 may be buried between respective cells that form the patterns of the heat-adhesion layer. Preferably, the hydrophobic particles may be well buried in a wall between the cells as a filling process is performed better between the cells when the heat-adhesion layer is formed in hexagonal patterns by two or more types of wax having different melting points.

In an embodiment, although the hydrophobic particles 130 may be buried between the patterns as illustrated in the drawing, the hydrophobic particles 130 may be adhered to an outermost surface of the heat-adhesion layer 120. Further, the hydrophobic particles 130 may be adhered to the heat-adhesion layer 120 in a state in which the hydrophobic particles 130 are mixed with the heat-adhesion layer 120.

In an embodiment, the buried hydrophobic particles may be buried to a thickness of 1 μm to 50 μm. Water-repellent and oil-repellent functions may be dropped when the buried hydrophobic particles are buried to a thickness of less than 1 μm, and adhesion with the container may not be easy when the buried hydrophobic particles are buried to a thickness of more than 50 μm.

In an embodiment, a water contact angle of the lid packing material for food container may be 150° or more at room temperature and 100° to 140° at a temperature of 50° C. or more.

In an embodiment, the lid packing material for food container may have a surface roughness including a central line average roughness Sa of 20 μm to 30 μm and a ten point average roughness Sz of 8 μm to 15 μm.

In an embodiment, the lid packing material for food container may have a line roughness including a central line average roughness Ra of 15 μm to 25 μm and a ten point average roughness Rz of 35 μm to 45 μm.

A lid packing material for food container according to an embodiment of the example embodiments has excellent super water-repellent performance in relatively high temperature conditions and can sustain this effectively. Therefore, as the lid packing material for food container has strong contamination resistance, the contents may easily flow down even if contents are smeared in the lid packing material for food container, and the amount of contents smeared in a food packing material is minimized accordingly so that consumers may eat more of the contents. Further, a water-repellent food packing material according to an embodiment of the example embodiments has excellent adhesion capacity with containers so that the water-repellent food packing material may be used as a container lid packaging material for sealing the top surface of the containers.

Hereinafter, the example embodiments will be described in detail with reference to the following Example and Comparative Example. However, the technical idea of the example embodiments is not limited or restricted thereby.

Example

After coating a two-component urethane-based adhesive as a heat-adhesion layer on a substrate layer obtained by laminating a 12 μm PET layer and a VMPET layer, a mixture of 50 wt % of paraffin wax and 5 wt % of carnauba wax was coated on the two-component urethane-based adhesive.

Subsequently, circular patterns having a diameter of 50 nm were formed on the heat-adhesion layer by using a photolithography process. Subsequently, silica ($SiO_2$) having an average particle diameter of 7 nm, i.e., "Aerosil" product of Degussa Corporation as hydrophobic particles was coated by a spray coating. The spray coating process was performed under conditions including a pressure of 6 bar and a spray distance of 10 cm.

Figure 5:
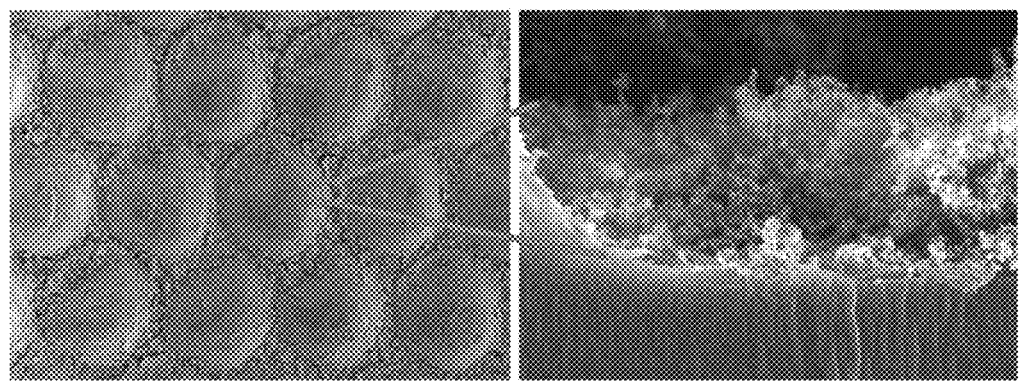
FIG. 5 is images showing patterns on a heat-adhesion layer surface of a lid packing material for food container according to Example 1 of the example embodiments.

FIG. 5 is images showing patterns on a heat-adhesion layer surface of a lid packing material for food container according to Example of the example embodiments. Referring to the left portion of FIG. 5, it can be seen that the heat-adhesion layer surface is formed in circular patterns. Further, referring to the right portion of FIG. 5, i.e., an enlarged view, it can be seen that $SiO_2$ fine particles are coated on a patternless wall portion of the heat-adhesion layer.

Comparative Example

A packing material was manufactured in the same manner as in Example except that carnauba wax was not added in Example.

Evaluating Water Repellency/Oil Repellency of Semisolid Yoghurt

The lid packing material for food container of Example manufactured above was used as a lid of a yoghurt container for containing semisolid yoghurt (50% or more of oil and fat ingredients).

The yogurt container was tilted at an angle of about 45° and evaluated whether the semisolid yoghurt was flowing down without any smearing.

Figure 6A:
FIG. 6A is an image showing a result of evaluating water repellency of lid packing materials for food container according to Comparative Example.
Figure 6B:
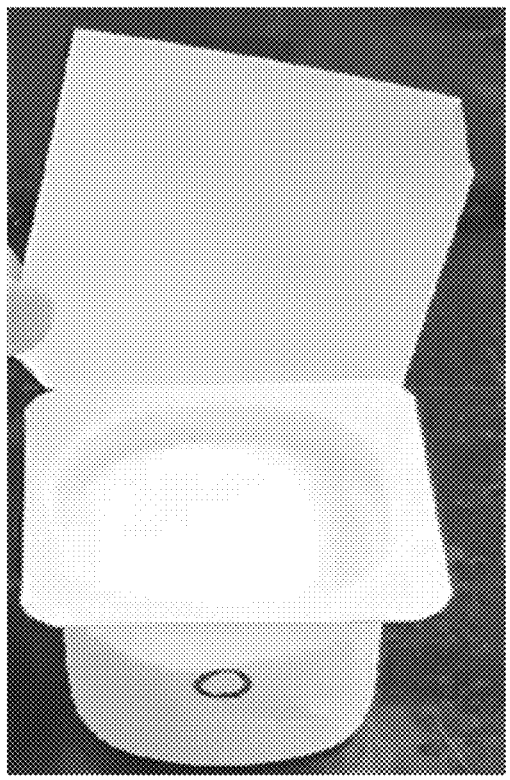
FIG. 6B is an image showing a result of evaluating water repellency of lid packing materials for food container according to Example 1.

FIG. 6A is an image showing a result of evaluating water repellency of lid packing materials for food container according to Comparative Example, and FIG. 6B is an image showing a result of evaluating water repellency of lid packing materials for food container according to Example. It can be confirmed that the semisolid yoghurt was heavily smeared in the lid in FIG. 6A, and the semisolid yoghurt was continuously flown down without smearing in FIG. 6B.

Analyzing Water Contact Angle of Semisolid Yoghurt

Water was dropped on the surface of the packing materials of Comparative Example and Example of the example embodiments.

Figure 7:
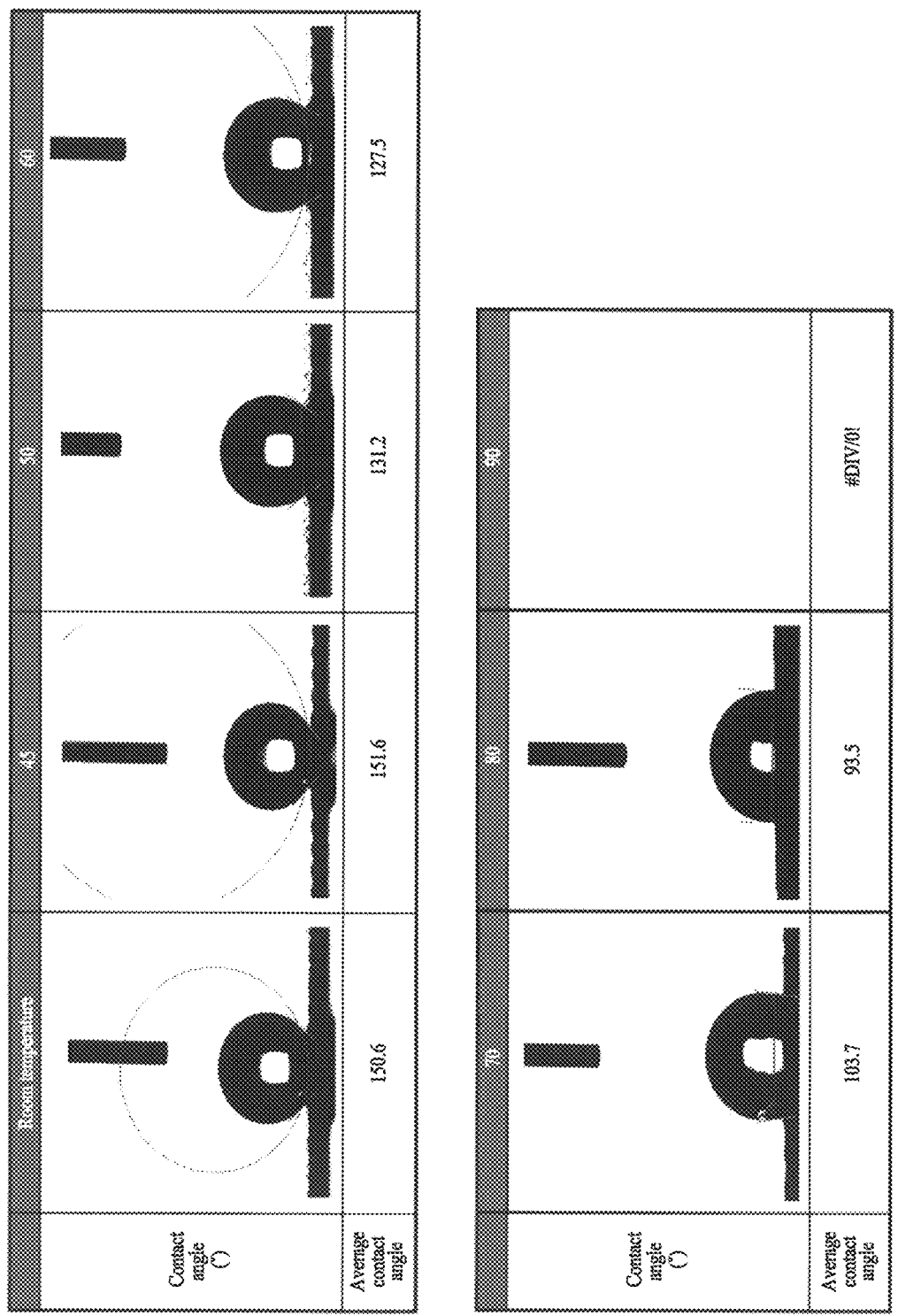
FIG. 7 is images showing contact angles according to temperatures of the packing material of Comparative Example of the example embodiments.
Figure 8:
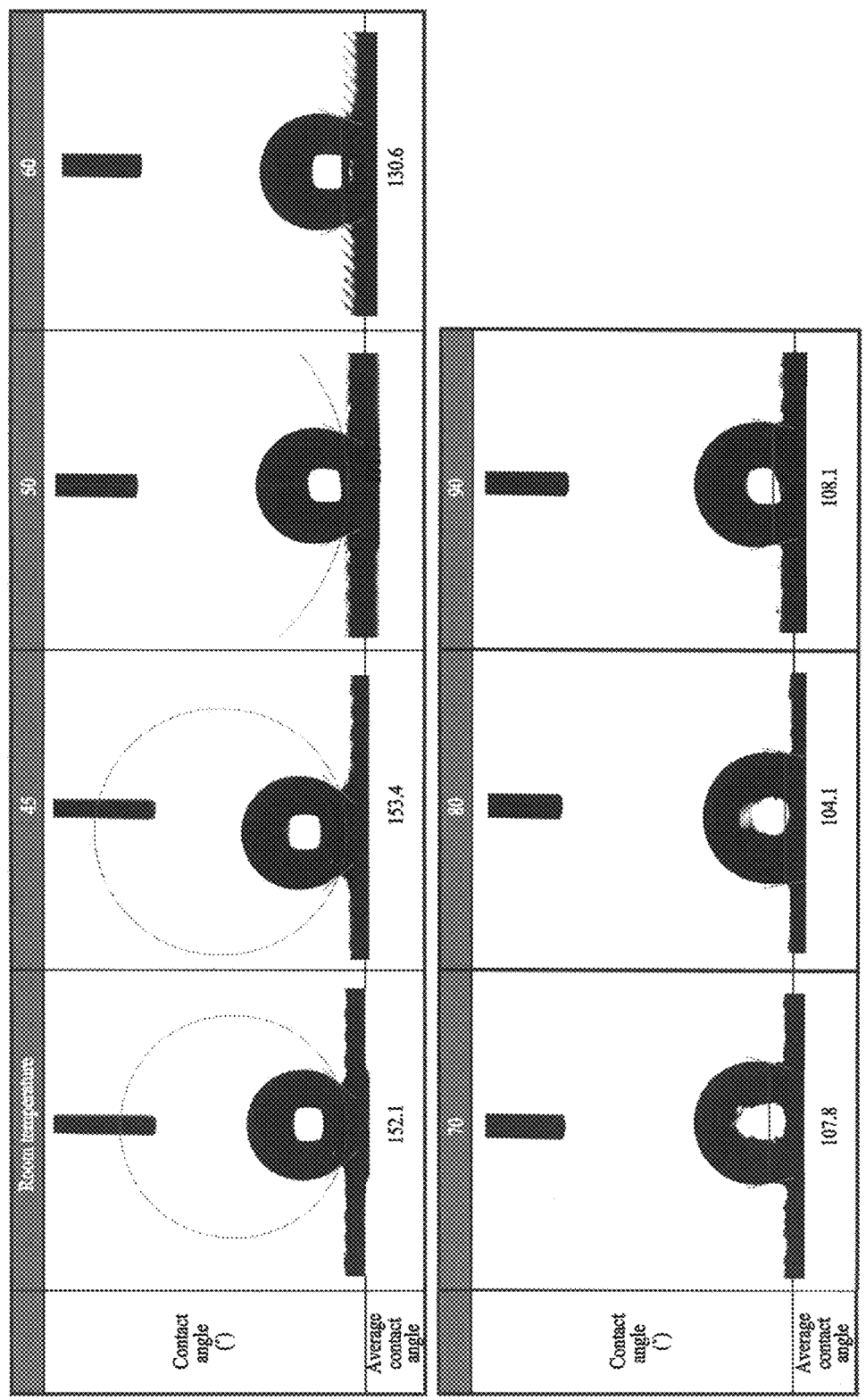
FIG. 8 is images showing contact angles according to temperatures of the packing material of Example 1 of the example embodiments.

FIG. 7 is images showing contact angles according to temperatures of the packing material of Comparative Example of the example embodiments, and FIG. 8 is images showing contact angles according to temperatures of the packing material of Example of the example embodiments.

The following Table 1 shows contact angles according to temperatures of the packing materials of Comparative Example and Example of the example embodiments.

TABLE 1

| | Contact angle (°) | Room temperature | 45 | 50 | 60 | 70 | 80 | 90 |
|---|---|---|---|---|---|---|---|---|
| Comparative Example | Wax + $SiO_x$ | 150.6 | 151.6 | 131.2 | 127.5 | 103.7 | 93.5 | — |
| Example | Wax + carnauba wax + $SiO_x$ | 152.1 | 153.4 | 131.7 | 130.6 | 107.8 | 104.1 | 108.1 |

Referring to FIG. 7, FIG. 8 and Table 1, Contact angles of Comparative Example and Example have not changed up to 45° C. and have begun to decrease from 50° C. When comparing the contact angles under high temperature conditions, it can be seen that contact angles of Comparative Example are lower than those of Example in a temperature range of 50° C. to 80° C.

High Temperature Constituent Analysis of Packing Materials

High temperature constituent analysis of the packing materials of Comparative Example and Example was carried out by placing samples on hot plates and analyzing items according to thermal deformation of the samples using FT-IR and optical microscope equipment.

The packing material of Comparative Example was grown by 1231 cm$^{-1}$ (crystalline) from 40° C. and decreased by 1093 cm$^{-1}$ (amorphous). It was confirmed that the packing material of Comparative Example was grown by 1021 cm$^{-1}$ (crystalline) at 60° C.

The packing material of Example was grown by 1231 cm$^{-1}$ (crystalline) from 50° C. and began to decrease by 1080 cm$^{-1}$ (amorphous).

Analyzing Surface Three-Dimensional Patterns of Packing Materials

Three-dimensional pattern analysis of packing materials of Comparative Example and Example was conducted by using three-dimensional microscope equipment.

Figure 9A:
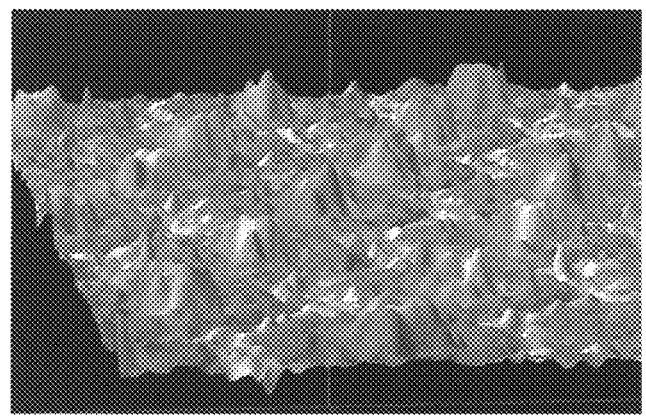
FIG. 9A is an image showing a result of analyzing three-dimensional (3D) patterns on the surfaces of the packing materials according to Comparative Example.
Figure 9B:
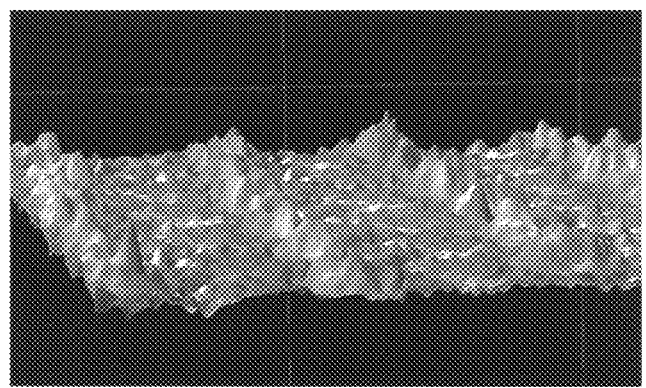
FIG. 9B is an image showing a result of analyzing 3D patterns on the surfaces of the packing materials according to Example.

FIG. 9A is an image showing a result of analyzing three-dimensional (3D) patterns on the surfaces of the packing materials according to Comparative Example, and FIG. 9B is an image showing a result of analyzing 3D patterns on the surfaces of the packing materials according to Example.

Table 2 shows surface roughness values and line roughness values of the surfaces of the packing materials according to Comparative Example and Example of the example embodiments.

TABLE 2

| Surface roughness (μm) | | | | Line roughness (μm) | | | |
|---|---|---|---|---|---|---|---|
| Sa | | Sz | | Ra | | Rz | |
| Comparative Example | Example | Comparative Example | Example | Comparative Example | Example | Comparative Example | Example |
| 18.6 | 20.3 | 9.8 | 9.8 | 16.6 | 17.1 | 32.4 | 39.0 |

It can be seen that surface roughness values and line roughness values of the packing material of Example are greater than those of the packing material of Comparative Example.

Sealing Strength Analysis According to Temperatures of Packing Materials

Sealing strength analysis according to temperatures of the packing materials of Comparative Example and Example was performed using a high temperature universal testing machine (UTM) (LOD5 of LLOYD Company, Materials Analysis Center of the Institute of Technology).

Sample widths were 15 mm, measurement distance was 50 mm, measurement analysis rate was 200 mm/min, and high temperature conditions were 90° C., 100° C. and 110° C.

Table 3 below shows results of analyzing sealing strength values according to temperatures of the packing materials of Comparative Example and Examples of the example embodiments.

TABLE 3

| | Sealing temperature (° C.) | | | | | |
|---|---|---|---|---|---|---|
| | 210 | | 200 | | 190 | |
| Product classification | Comparative Example | Example | Comparative Example | Example | Comparative Example | Example |
| N/15 mm | 23.88 | 24.59 | 28.82 | 25.09 | 36.95 | 35.31 |

Referring to Table 3, it is confirmed that Example tends to have higher sealing strength values than Comparative Example.

Although the example embodiments have been described by limited embodiments and drawing as described above, the example embodiments are not limited to the embodiments, and those skilled in the art to which the example embodiments pertain enable various modifications and changes to be made from such descriptions. Therefore, the scope of the example embodiments should not be limited to and defined by described embodiments but should be defined by equivalents of the patent claims as well as patent claims described later.

What is claimed is:

1. A lid packing material for food container, the lid packing material comprising:
    a substrate layer;
    a heat-adhesion layer formed on the substrate layer; and
    hydrophobic particles,
    wherein the heat-adhesion layer includes at least two types of wax having different melting points,
    wherein one of the at least two types of wax having different melting points of the heat-adhesion layer is carnauba wax,
    wherein the carnauba wax is contained in an amount of 30 wt % to 60 wt % with respect to the total weight of the at least two types of wax having different melting points,
    wherein all of the hydrophobic particles are buried between respective cells forming patterns of the heat-adhesion layer,
    wherein the lid packing material for food container has a surface roughness on a side of the heat-adhesion layer opposite to the substrate layer including a central line average roughness Sa of 20 μm to 30 μm and a ten point average roughness Sz of 8 μm to 15 μm,
    wherein the lid packing material for food container has a line roughness on the side of the heat-adhesion layer opposite to the substrate layer including a central line average roughness Ra of 15 μm to 25 μm and a ten point average roughness Rz of 35 μm to 45 μm,
    wherein the buried hydrophobic particles are buried to a thickness less than a height of the cells forming patterns of the heat-adhesion layer.

2. The lid packing material for food container of claim 1, wherein the at least two types of wax includes at least one selected from the group consisting of a petroleum wax, a vegetable wax, and an animal wax.

3. The lid packing material for food container of claim 1, wherein the at least two types of wax includes at least one selected from the group consisting of beeswax, paraffin wax, microcrystalline wax, polyolefin wax, polyethylene wax, polypropylene wax, acrylate wax, fatty acid amide wax, silicon wax, polytetrafluoroethylene wax, carnauba wax, bayberry wax, beeswax, Shellac wax, Spermaceti wax, Montan wax, Ozokerite wax, Ceresin wax, Fischer-Tropsch wax, sugar cane wax, Bake wax, rice bran wax, and Candelilla wax.

4. The lid packing material for food container of claim 1, wherein the heat-adhesion layer further includes at least one selected from the group consisting of a polymethylmethacrylate (PMMA) bead, a glass bead, a zirconia bead, a ceramic bead, a metal bead, and a resin bead.

5. The lid packing material for food container of claim 1, wherein the heat-adhesion layer includes at least one pattern selected from the group consisting of a circular pattern, a hollow pattern, an elliptical pattern, a triangular pattern, a square pattern, a pentagonal pattern, a hexagonal pattern, an octagonal pattern, a cylindrical pattern, and a polyprism pattern, and includes patterns arranged in a grid pattern.

6. The lid packing material for food container of claim 5, wherein the patterns have an average size of 50 μm to 200 μm.

7. The lid packing material for food container of claim 1, wherein the heat-adhesion layer has a thickness of 50 μm to 200 μm.

8. The lid packing material for food container of claim 1, wherein the hydrophobic particles include at least one selected from the group consisting of silica, alumina, aluminosilicate, titania, silica aerogel, iron oxide, zinc oxide, copper oxide, nickel oxide, and cobalt oxide.

9. The lid packing material for food container of claim 1, wherein the hydrophobic particles have a particle size of 1 nm to 2,000 nm.

10. The lid packing material for food container of claim 1, wherein the buried hydrophobic particles are buried to a thickness of 1 μm to 50 μm.

11. The lid packing material for food container of claim 1, having a water contact angle on the side of the heat-adhesion layer opposite to the substrate layer of 150° or more at room temperature and 100° to 140° at a temperature of 50° C. or more.

12. The lid packing material for food container of claim 1, wherein the two types of wax having different melting points are mixed to a weight ratio of 10:1 to 30:1.

* * * * *